United States Patent Office 3,518,271
Patented June 30, 1970

3,518,271
1,2,3,4,4a,5,6,7,8,13 - DECAHYDRO - 7,13b - METHANO - 13bH - INDOLO[3,2-e][2]BENZAZOCINES AND PROCESS FOR THEIR PRODUCTION
John Shavel, Jr., Mendham, and Harold Zinnes, Rockaway, N.J., assignors to Warner-Lambert Pharmaceutical Company, Morris Plains, N.J., a corporation of Delaware
No Drawing. Continuation-in-part of application Ser. No. 634,133, Apr. 27, 1967. This application Aug. 31, 1967, Ser. No. 664,626
Int. Cl. C07d 35/02
U.S. Cl. 260—286       11 Claims

ABSTRACT OF THE DISCLOSURE

Compounds of the following structures Ia and Ib:

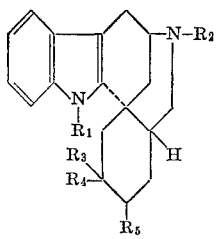

Ia

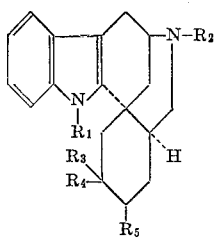

Ib are disclosed wherein $R_1$ is hydrogen, lower alkyl or aralkyl; $R_2$ is hydrogen, lower alkyl, aralkyl, aryl, cyclopropylmethyl, carbolower alkoxy and acyl; $R_3$ and $R_4$ are hydrogen, hydroxy, lower alkyl, or aryl; and $R_5$ represents hydrogen and carbolower alkoxy. The method of preparation of Ia and Ib wherein $R_3$ and $R_4$ are keto consists of reducing a compound of structure II or III with sodium and tert-butanol in liquid ammonia and treatment of the resulting product with dilute acid. After separation of the epimeric ketones, they are transformed into a variety of derivatives. These products are useful as analgesics.

---

This application is a continuation-in-part of our co-pending application U.S. Ser. No. 634,133, filed Apr. 27, 1967.

The present invention relates to 1,2,3,4,4a,5,6,7,8,13-decahydro - 7,13b-methano-13bH-indolo[3,2-e][2]benzazocines of the formulae:

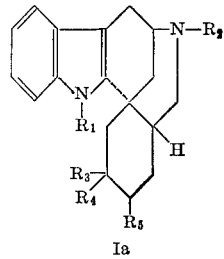

Ia

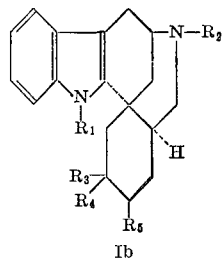

Ib wherein $R_1$ is hydrogen, lower alkyl or aralkyl; $R_2$ is hydrogen, lower alkyl, aralkyl, aryl, cyclopropylmethyl, carbolower alkoxy and acyl; $R_3$ and $R_4$ taken together represent hydrogen, and hydrogen respectively, hydrogen and hydroxy respectively, lower alkyl (1–6 C) and hydroxy respectively, aryl and hydroxy respectively, aralkyl and hydroxy respectively, or =O and $R_5$ represents hydrogen and carbolower alkoxy.

In the above definition, lower alkyl and the alkyl portion of "lower alkoxy" or "aralkyl" contain from 1 to 6 carbon atoms such as methyl, ethyl, propyl, isopropyl, butyl, isobutyl and the like.

The aryl portion of "aralkyl" includes both mono-homocyclic ring systems such as phenyl as well as mono-heterocyclic ring systems such as furyl, pyridyl, and the like.

Acyl is the residue derived from a carboxylic acid such as acetyl, propionyl, benzoyl and the like.

The compounds of this invention have the following numbering system:

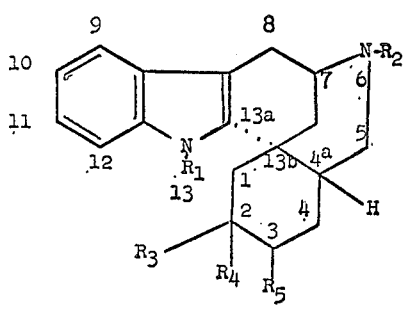

This invention also includes within its scope a novel process for the production of the above compounds.

The compounds of this invention have been observed to raise the pain threshold of mammalian hosts in standard analgesic tests, such as the Eddy Hot Foot Plate Method, and are useful as analgesics, in relieving chronic or acute pains. In order to use these compounds, they are combined with a pharmaceutical carrier, such as lactose, starch, mannitol, and the like to form dosage forms, such as, tablets, capsules, injectables and the like. To a mammal weighing about 70 kg., they are administered orally or parenterally at a dose level of about 1 mg. to 100 mg. several times daily to produce the desired analgesia.

The compounds of this invention are members of one or the other of the two possible sterochemical series. These are designated, respectively, by the Formulae I$a$ and I$b$. These formulae show that the two series differ only in the configuration of the ring junction at position 4$a$. Thus, the compounds represented by I$a$ are epimers of the corresponding compounds represented by I$b$. In I$a$, the hydrogen at 4$a$ is trans with respect to the indole group at 13$b$ so that the geometry of the ring system resembles that of a trans-decahydroisoquinoline. In I$b$, the hydrogen at 4$a$ is cis to the indole group at 13$b$ so that the geometry resembles that of a cis-decahydroisoquinoline. Thus, in naming the compounds of this invention which correspond to the configuration of I$a$, the prefix "trans-[13b(indolo),4aH] is used, whereas with I$b$ the prefix "cis-[13b(indolo),4aH]" is used. For example, a compound of this invention belonging to the series having the configuration of I$a$ where $R_1$, $R_2$, $R_3$, $R_4$, and $R_5$ are hydrogen will be named as trans-[13b (indolo), 4aH]-1,2,3,4,4a,5,6,7,8,13 - decahydro - 7,13b-methano-13bH-indolo[3.2-e][2]benzazocine.

According to the process of this invention the above compounds are prepared by treating a compound of the formula:

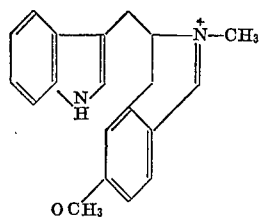

II or preferably its cyano derivative corresponding to structure

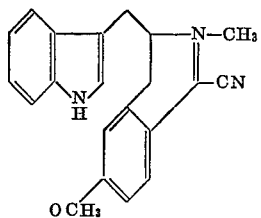

III with sodium and tert-butyl alcohol in liquid ammonia to give a compound corresponding to structure IV in which $R_1$=hydrogen.

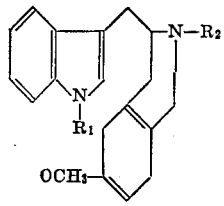

IV

This reaction is preferably effected at —33° C. which is the boiling point of liquid ammonia.

If substitution on the indole nitrogen is desired, compound IV, wherein R=hydrogen, can be alkylated by reaction with sodium amide and an alkyl or aralkyl halide in liquid ammonia to give compounds of Formula IV wherein $R_1$=alkyl or aralkyl.

The compounds of structure IV, wherein $R_1$=hydrogen, alkyl or aralkyl are then refluxed with a mineral acid such as hydrochloric acid. This results in a cyclization reaction to give a mixture of I$a$ and I$b$ wherein $R_1$ is hydrogen, alkyl, or aralkyl; $R_5$ is hydrogen; $R_2$ is alkyl or aralkyl, and $R_3$ and $R_4$ taken together are keto. This reaction is preferably carried out under an atmosphere of nitrogen and at a temperature of about 60 to 80° C. employing a lower molecular weight alcohol as the solvent.

The epimers are separated by means of a combination of fractional crystallization and chromatography. The isolation of most of the trans epimer, corresponding to Formula I$a$, is achieved by crystallization of the crude epimeric mixture from a solvent such as dichloromethane or a lower molecular weight alcohol. After removal of the first crops of the crystalline trans epimer, the filtrate is concentrated and is chromatographed over a column packed with alumina using dichloromethane as the eluent.

The first eluate contains more of the trans epimer. Further elution gives the cis epimer, corresponding to formula I$b$. These ketones, thus obtained, may be transformed into other compounds of this invention. Thus for example:

(1) Reaction of the ketones with hydrazine and sodium hydroxide in ethylene glycol gives those compounds of this invention of Formula I$a$ or I$b$ in which $R_3$, $R_4$ and $R_5$ are hydrogen and $R_2$ is lower alkyl or aralkyl and $R_1$ is hydrogen, lower alkyl or aralkyl.

(2) Reaction of the ketones with a metal hydride such as lithium aluminum hydride gives those compounds of this invention wherein $R_3$ and $R_5$ are hydrogen; $R_2$ is lower alkyl or aryl; $R_4$ is hydroxy, and $R_1$ is hydrogen, lower alkyl or aralkyl.

(3) Reaction of the ketones with a Grignard reagent gives those compounds of this invention in which $R_5$ is hydrogen; $R_2$ is lower alkyl or aryl; $R_3$ is lower alkyl, aryl, or aralkyl; $R_4$ is hydroxy, and $R_1$ is hydrogen, lower alkyl or aralkyl.

(4) Reaction with dimethyl carbonate and sodium hydride gives those compounds of this invention in which $R_2$ is lower alkyl or aryl; $R_3$ and $R_4$ taken together are keto; $R_5$ is carbolower alkoxy, and $R_1$ is hydrogen, lower alkyl or aralkyl.

Those compounds of this invention wherein $R_1$ and $R_2$ are hydrogen, lower alkyl or aralkyl and $R_3$, $R_4$, and $R_5$ are hydrogen may be treated with an alkyl chloroformate and sodium or potassium carbonate in a solvent such as dichloromethane to give those compounds of this invention in which $R_1$ is hydrogen, lower alkyl or aralkyl; $R_3$, $R_4$ and $R_5$ are hydrogen and $R_2$ is carbolower alkoxy. These compounds may then be reacted with a solution of hydrogen bromide in acetic acid to give those compounds of the invention in which $R_1$ is hydrogen, lower alkyl or aralkyl; $R_2$, $R_3$, $R_4$, and $R_5$ are hydrogen. They may also be reacted with an acylating agent such as acetyl chloride or cyclopropyl carbonyl chloride to give those compounds in which $R_1$ is hydrogen, lower alkyl, or aralkyl; $R_3$, $R_4$, and $R_5$ are hydrogen and $R_2$ is acyl. The latter may also be reduced with lithium aluminum hydride to give compounds of this invention in which $R_1$ is hydrogen, lower alkyl, aralkyl; $R_3$, $R_4$, and $R_5$ are hydrogen and, $R_2$ is lower alkyl or cyclopropylmethyl.

The starting materials are described and prepared in accordance with our co-pending application Ser. No. 634,133, filed Apr. 27, 1967.

The foregoing reactions may be illustrated as follows:

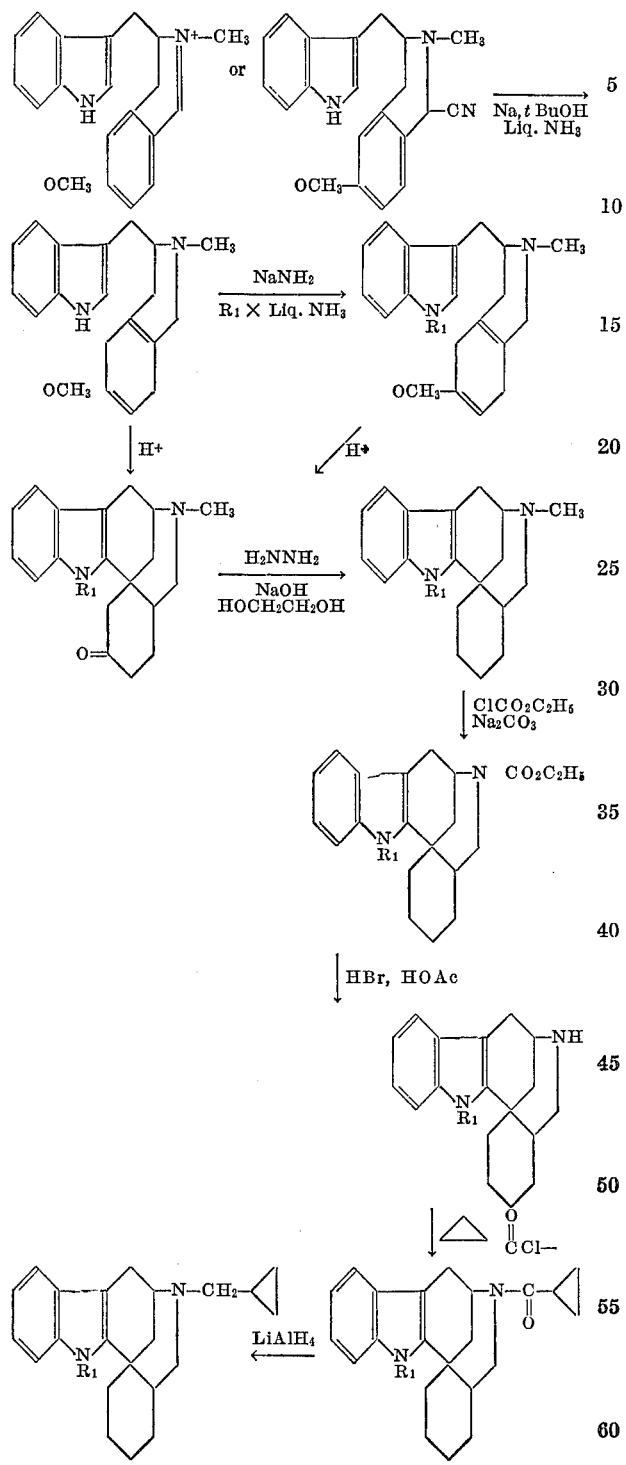

In the case of those compounds which correspond to the configuration Ib, when $R_1$, $R_3$, $R_4$ and $R_5$ are hydrogen, $R_2$ lower alkyl or aralkyl, they may be reacted with an alkyl or aralkyl halide together with sodium or potassium amide in liquid ammonia to give compounds corresponding to the configuration Ib, wherein $R_3$, $R_4$, and $R_5$ are hydrogen; $R_1$ and $R_2$ are lower alkyl or aralkyl.

The compounds of this invention form acid addition salts, and such salts are readily prepared by the usual methods, such as, for example, the reaction of a stoichiometrically equivalent amount of the base and the desired acid in an inert common solvent. Examples of acids which are suitable for the preparation of acid addition salts of the amine base of this invention are inorganic acids, such as, for example, hydrochloric, nitric, sulfuric, phosphoric, and the like acids, and organic acids, such as, for example, benzoic, acetic, salicylic, maleic, tartaric, citric, and the like acids. The preferred salts are those which are pharmaceutically acceptable, that is, they are acid addition salts which are no more toxic than the bases from which they are prepared and which possess the necessary physical properties that render them suitable for incorporation into dosage forms in combination with the desired pharmaceutical carriers.

The following examples are included in order further to illustrate the invention. All temperatures are given in degrees centigrade. Room temperature is from about 20 to 30° C.

EXAMPLE 1

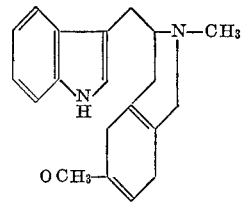

3(indol-3-ylmethyl)-6-methoxy-2-methyl-1,2,3,4,5,8-hexahydroisoquinoline

A solution of 20 g. of 1-cyano-3-(indol-3-ylmethyl)-6-methoxy-2-methyl-1,2,3,4-tetrahydroisoquinoline in 340 ml. of tetrahydrofuran was added to 680 ml. of liquid ammonia and 30 g. of sodium and 127 ml. of tert-butanol were alternately added in portions over a period of 1 hr. The solution was stirred for 1 hr. and the blue color was discharged by the addition of 120 ml. more tert-butanol. The ammonia was evaporated off and the tetrahydrofuran solution was poured into 3500 ml. of ice-water. The resulting precipitate was collected and triturated with ethanol to give 16 g. of crystalline product, M.P. 169–171°. Recrystallization of a portion from benzene gave material, M.P. 171–172°.

Analysis.—Calc'd for $C_{20}H_{24}N_2O$ (percent): C, 77.88; H, 7.84; N, 9.08. Found (percent): C, 77.79; H, 7.97; N, 9.27.

EXAMPLE 2

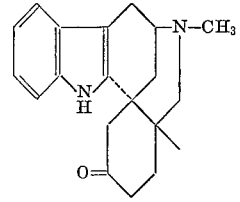

and

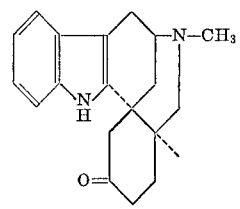

and 1,2,3,4,4a,5,6,7,8,13-decahydro-6-methyl-7,13b-methano-13bH-indolo[3,2-e][2]benzazocin-2-one A mixture of 43 g. of 3(indol-3-ylmethyl)-6-methoxy-2-methyl-1,2,3,4,5,8-hexahydroisoquinoline, 310 ml. of concentrated hydrochloric acid, and 750 ml. of methanol was refluxed under nitrogen for 1 hr., the methanol was distilled off and 2000 ml. of water was added. The mixture was made alkaline with ammonium hydroxide and extracted with dichloromethane. Concentration of the dried dichloromethane solution to a volume of about 100 ml. gave 20.1 g. of chromatographically pure ($R_f$ 0.26) trans epimer, M.P. 259–261° dec., which gave a negative Ehrlich test. Recrystallization from methanol gave material, M.P. 260–262° dec., $pK_A$ 7.9.

*Analysis.*—Calc'd for $C_{19}H_{22}N_2O$ (percent): C, 77.52; H, 7.53; N, 9.52. Found (percent): C, 77.28; H, 7.72; N, 9.63.

The phosphate salt, which precipitated when α methanol-dichloromethane solution of the base was treated with a slight excess of phosphoric acid, had M.P. 294–296° dec.

*Analysis.*—Calc'd for $C_{19}H_{22}N_2O \cdot H_3PO_4 \cdot \frac{1}{2} CH_3OH$ (percent): C, 57.35; H, 6.66; N, 6.86; P, 7.58. Found (percent): C, 57.36; H, 6.47; N, 6.85; P, 7.36. The hemimethanolate was stable to drying in vacuo at 140°.

Recrystallization from water gave the hemihydrate, M.P. 290–296° dec.

*Analysis.*—Calc'd for $C_{19}H_{22}N_2O \cdot H_3PO_4 \cdot \frac{1}{2} H_2O$ (percent): C, 56.86; H, 6.53; N, 6.98; P, 7.72; $H_2O$, 2.2. Found (percent): C, 56.85; H, 6.74; N, 7.08; P, 7.44; $H_2O$ (by Karl Fischer), 2.9.

The dichloromethane mother liquor was concentrated to a small volume and chromatographed over 430 g. of alumina (column height 48 cm.) using dichloromethane as the eluent. The first 2000 ml. of eluate was found to contain a mixture of the epimer A and a second faster moving ($R_f$ 0.32) component, the former being the major component. Evaporation of the next 10,000 ml. of eluent gave 8.5 g. of a solid consisting predominately of the faster moving component. Recrystallization from acetonitrile-dichloro-methane gave 4.8 g. of cis epimer, M.P. 225–226.5° dec., $R_f$ 0.32, which gave a negative Ehrlich test. Recrystallization from acetonitrile gave material M.P. 227.5–228.5° dec., $pK_A$ 7.54.

*Analysis.*—Calc'd for $C_{19}H_{22}N_2O$ (percent): C, 77.52; H, 7.53; N, 9.52. Found (percent): C, 77.74; H, 7.67; N, 9.80.

EXAMPLE 3

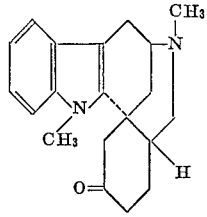

and

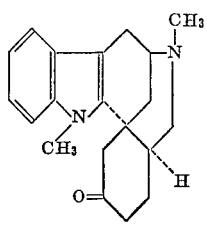

1,2,3,4,4a,5,6,7,8,13-decahydro-6,13-dimethyl-7,13b-methano-13bH-indolo[3,2-e][2]benzacocin-2-one To a solution of 6.4 g. (0.165 mole) of sodium amide in 800 ml. of liquid ammonia was added 17.0 g. (0.55 mole) of 3-(indol-3-ylmethyl)-6-methoxy-2-methyl-1,2,3,4,5,8-hexahydroisoquinoline. The mixture was stirred for 1.5 hrs., 31.2 g. (0.22 mole) of methyl iodide was added and stirring was continued for 2.5 hrs. Evaporation of the ammonia followed by addition of ice-water gave a solid precipitate which was collected, washed well with water, and sucked dry to obtain 3-(1-methylindol-3-ylmethyl)-6-methoxy-2-methyl-1,2,3,4,5,8-hexahydroisoquinoline. This was not purified further but was refluxed with a mixture of 300 ml. of methanol and 120 ml. of concentrated aqueous hydrochloric acid, under a nitrogen atmosphere for 2 hrs. The methanol was distilled off, and the residue was partitioned between dilute aqueous ammonium hydroxide and dichloromethane. Concentration of the dried dichloromethane solution to a small volume gave 5.6 g. of crystalline material. The remainder of the dichloromethane was evaporated and the residue was triturated with 10 ml. of methanol to give 2.8 of additional crystals. These products were combined and recrystallized from methanol-dichloromethane to give 6.7 g. of chromatographically pure ($R_f$ 0.28) trans epimer, M.P. 210–212° dec.

*Analysis.*—Calcd. for $C_{20}H_{24}N_2O$ (percent): C, 77.88; H, 7.84; N, 9.08. Found (percent): C, 77.77; H, 7.86; N, 9.33.

The methanol filtrate was evaporated to dryness and the residue was dissolved in dichloromethane and chromatographed over 210 g. (34 cm. column) of alumina using dichloromethane as the eluent. After discarding the first 150 ml. of eluate, the next 1500 ml. was evaporated to dryness. The residue (4.7 g.) was recrystallized from Skellysolve B to give 1.75 g. of chromatographically pure ($R_f$ 0.56) cis epimer, M.P. 161–162°.

*Analysis.*—Calcd. for $C_{20}H_{24}N_2O$ (percent): C, 77.88; H, 7.84; N, 9.08. Found (percent): C, 77.91; H, 7.94; N, 9.18.

EXAMPLE 4

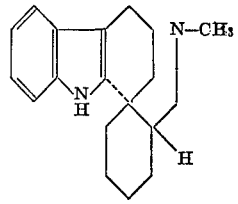

Trans 1,2,3,4,4a,5,6,7,8,13 - decahydro - 6 - methyl-7,13b-methano-13bH-indolo[3,2-e][2]benzazocine A mixture of 13.6 g. (0.046 mole) of trans 1,2,3,4,4a,5,6,7,8,13 - decahydro - 6 - methyl - 7,13b - methano-13bH-indolo[3,2-e][2]benzazocin - 2 - one, 136 g. of hydrazine hydrate, 13.6 g. of sodium hydroxide, and 820 ml. of ethylene glycol was refluxed under nitrogen for 1 hr. and distilled at atmospheric pressure till the reflux temperature was a constant 194°. Additional ethylene glycol was added to replace that lost in the distillation and refluxing was continued for 3 hrs. The reaction mixture was concentrated to half of its volume and poured into 2800 ml. of ice-water. The precipitated solid was collected, washed well with water, and dissolved in dichloromethane. The dried solution was evaporated to a residue which was triturated with methanol to give 10.3 g. of product, M.P. 142–145°. Recrystallization from methanol gave material, 144–145°, $pK_A$ 8.68.

*Analysis.*—Calcd. for $C_{19}H_{24}N_2$ (percent): C, 81.38; H, 8.63; N, 9.99. Found (percent): C, 81.57; H, 8.77; N, 9.91.

EXAMPLE 5

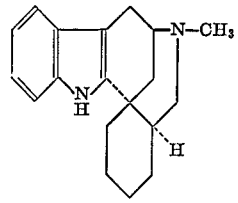

Cis 1,2,3,4,4a,5,6,7,8,13 - decahydro - 6 - methyl - 7,13b-methano-13bH-indolo[3,2-e][2]benzazocine A mixture of 2.0 g. (0.007 mole) of cis 1,2,3,4,4a,5,6,7,8,13 - decahydro - 6 - methyl - 1,13b - methano - 13bH indolo[3,2-e][2]benzazocine-2-one, 20 g. of hydrazine hydrate, 2 g. of sodium hydroxide, and 125 ml. of ethylene glycol was refluxed under nitrogen for 1 hr. and distilled at atmospheric pressure until the reflux temperature was a constant 194°. Additional ethylene glycol was added to replace that lost in the distillation and refluxing was continued for 3 hrs. The reaction mixture was concentrated to ca. one-half of its volume and poured into 500 ml. of ice-water. The precipitated solid was collected, washed well with water, and dissolved in dichloromethane. The dried solution was evaporated to a residue which was triturated with 5 ml. of methanol to give 1.5 g. of crystalline product, M.P. 130.5–132°. Recrystallization from methanol-dichloromethane gave 1.3 g. of material, M.P. 132.5–133.5°, pK′$_A$ 8.50.

*Analysis.*—Calc'd. for $C_{19}H_{24}N_2$ (percent): C, 81.38; H, 8.63; N, 9.99. Found (percent): C, 81.40; H, 8.60; N, 10.28.

EXAMPLE 6

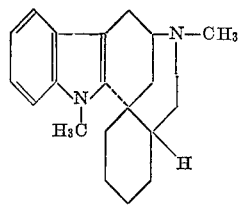

Trans 1,2,3,4,4a,5,6,7,8,13 - decahydro - 6,13 - dimethyl-7,13b-methano-13bH-indolo[3,2-e][2]benzazocine A mixture of 3.2 g. (0.01 mole) of trans 1,2,3,4,4a,5,6,7,8,13 - decahydro - 6,13 - dimethyl - 7,13b - methano-13bH-indolo[3,2-e][2]benzazocin-2-one, 29.4 g. of hydrazine hydrate, 3.2 g. of sodium hydroxide and 175 ml. of ethylene glycol was refluxed under nitrogen for 1 hr. and distilled at atmospheric pressure until the reflux temperature was a constant 194°. Additional ethylene glycol was added to replace that lost in the distillation and refluxing was continued for 20 hrs. The reaction mixture was concentrated by distillation until crystals started to separate and was poured into 1600 ml. of ice-water. The precipitated solid was collected, washed well with water, and dissolved in dichloromethane. Evaporation of the dried solution gave an oily residue. This was chromatographed over 60 g. of alumina using dichloromethane as eluent. Evaporation of the first 1000 ml. of eluate gave 990 mg. of a crystalline residue which could be shown by chromatography to consist predominantly of the expected product together with some faster moving material. Recrystallization from Skellysolve B gave 400 mg. of product, M.P. 121–123°, which showed a single spot ($R_f$ 0.59) on thin layer chromatography. Recrystallization gave an analytical sample, M.P. 122–123°.

*Analysis.*—Calc'd. for $C_{20}H_{26}N_2$ (percent): C, 81.60; H, 8.90; N, 9.51. Found (percent): C, 81.84; H, 8.88; N, 9.48.

EXAMPLE 7

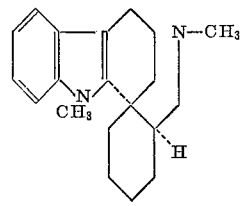

Cis 1,2,3,4,4a,5,6,7,8,13-decahydro-6,13-dimethyl-7,13b-methano-13bH-indolo[3,2-e][2]benzazocine (A) By alkylation of the corresponding $N_{IND}$-H compound.—To a solution of 0.36 g. (0.0092 mole) of sodium amide in 50 ml. of liquid ammonia was added 0.65 g. (0.0023 mole) of cis 1,2,3,4,4a,5,6,7,8,13-decahydro - 6-methyl-7,13b-methano-13bH-indolo[3,2-e][2]-benzazocine. The mixture was stirred for 1 hr., 0.84 ml. (0.0138 mole) of methyl iodide was added, and stirring was continued for 3 more hrs. Evaporation of the ammonia followed by the addition of ice water gave a precipitate which was collected and dissolved in dichloromethane. Evaporation of the dried solution gave 0.56 g. of solid residue which was devoid of NH absorption and which moved as a single spot on thin layer chromatography with $R_f$ 0.67 as compared with $R_f$ 0.59 for the starting material. Trituration with methanol gave 0.465 g. of crystalline product, M.P. 125–126.5°. Recrystallization from acetonitrile gave an analytical sample, M.P. 127.5–128.5°.

*Analysis.*—Calc'd for $C_{20}H_{26}N_2$ (percent): C, 81.60; H, 8.90; N, 9.51; mol wt. 294.4. Found (percent): C, 81.50; H, 8.77; N, 9.69.

(B) By reduction of the corresponding ketone.—A mixture of 1.0 g., (0.00325 mole) of cis 1,2,3,4,4a,5,6,7,8,13 - decahydro - 6,13-dimethyl-7,13b-methano-13bH-indolo[3,2-e][2]benzazocin-2-one, 9.2 g. of hydrazine hydrate, 1.0 g. of sodium hydroxide, and 55 ml. of ethylene glycol was refluxed under nitrogen for 1 hr. and distilled at atmospheric pressure until the reflux temperature was a constant 194°. Additional ethylene glycol was added to replace that lost in the distillation and refluxing was continued for 2.5 hrs. The reaction mixture was concentrated by distillation until crystals started to separate and was poured into 500 ml. of ice-water. The precipitated solid was collected, washed well with water and dissolved in dichloromethane. Evaporation of the dried solution gave 900 mg. of a solid residue which showed a single spot ($R_f$ 0.67) on thin layer chromatography. Recrystallization from acetonitrile gave 700 mg. of product. M.P. 127–128°; identified by mixture melting point and infrared spectrum.

EXAMPLE 8

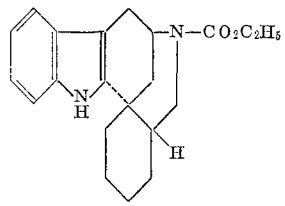

Trans 1,2,3,4,4a,5,6,7,8,13-decahydro-6-carbethoxy-7,13b-methano-13bH-indolo[3,2-e][2]benzazocine A mixture of 8.0 g. of trans 1,2,3,4,4a,5,6,7,8,13-decahydro - 6-methyl-7,13b-methano-13bH-indolo[3,2-e][2]-benzazocine, 80 ml. of ethyl chloroformate, 80 ml. of dichloromethane, and 16 g. of anhydrous sodium carbonate was stirred at room temperature for 20 hrs., filtered and distilled in vacuo to an oily residue. Most of the remaining ethyl chloroformate was removed by repeating the procedure of dissolving the residue in chloroform and distilling in vacuo. A chloroform solution of the resulting oil was washed successively with 1 N hydrochloric acid and water. It was dried and evaporated to a residue which was triturated with ethanol and then recrystallized from ethanol-methylene chloride to give 6.7 g. of product, M.P. 208–210°. Recrystallization gave an analytical sample, M.P. 209.5–210.5°.

*Analysis.*—Calc'd for $C_{21}H_{26}N_2O_2$ (percent): C, 74.52; H, 7.74; N, 8.28. Found (percent): C, 74.50; H, 7.72; N, 8.07.

EXAMPLE 9

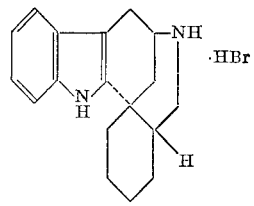

Trans 1,2,3,4,4a,5,6,7,8,13-decahydro-7,13-methano-13bH-indolo[3,2-e][2]benzazocine A mixture of 12.0 g. (0.036 mole) of trans 1,2,3,4,-4a,5,6,7,8,13 - decahydro - 6 - carbethoxy-7,13b-methano-13bH-indolo[3,2-e][2]benzazocine and 128 ml. of 10% hydrobromic acid in glacial acetic acid was stirred at 80° for 2 hrs., during which the evolution of gas and the precipitation of light green crystals took place. The crystals were collected and successively washed with acetic acid and ether to give 10.8 g. of product, which started to decompose at 250° and did not melt completely at 300°. It was used in the subsequent reaction without further purification.

A portion was ground up to a fine powder and then partitioned between ether and 1 N sodium hydroxide. The dried ether solution was treated with ethereal hydrogen bromide and the precipitated salt was collected and triturated with ether. Recrystallization from methanol gave an off-white analytical sample which did not melt at 340°.

Analysis.—Calc'd for $C_{18}H_{22}N_2 \cdot HBr$ (percent): C, 62.25; H, 6.68; Br, 23.01; N, 8.09; Found (percent): C, 62.02; H, 6.56; Br, 23.02; N, 7.88.

The original hydrobromic acid-acetic filtrate was treated with 800 ml. of water and extracted with ether. The ether solution was washed successively with 1 N sodium hydroxide and water. It was dried and evaporated to give 1.0 g. of unreacted starting material, M.P. 200–205°, which was reused in the same reaction.

EXAMPLE 10

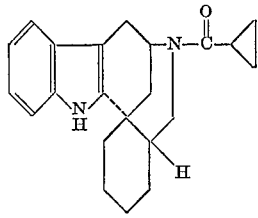

Trans 1,2,3,4,4a,5,6,7,8,13 - decahydro - 6 - cyclopropylcarbonyl - 7,13b - methano - 13bH - indolo[3,2-e][2]benzazocine Crude (9.3 g.) trans 1,2,3,4,4a,5,6,7,8,13-decahydro-7,13b-methano - 13bH - indolo[3,2 - e][2]benzazocine hydrobromide was ground up in a mortar and partitioned between dichloromethane and aqueous ammonium hydroxide. The dried dichloromethane solution was concentrated to a volume of 300 ml. and 8.3 g. (0.083 mole) of triethylamine and 3.6 g. (0.035 mole) of cyclopropane carboxylic acid chloride were successively added. The solution was allowed to stand at room temperature for 18 hrs. and was washed with several portions of water. It was dried and concentrated to a small volume to give 8.0 g. of crystalline product, M.P. 273–275° dec. Recrystallization of a portion from methanol-dichloromethane gave an analytical sample, M.P. 274–275° dec.

Analysis.—Calcd. for $C_{22}H_{26}N_2O$ (percent): C, 79.00; H, 7.84; N, 8.38. Found (percent): C, 79.09; H, 7.84; N, 8.65.

EXAMPLE 11

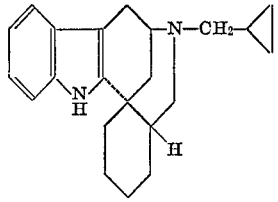

Trans 1,2,3,4,4a,5,6,7,8,13 - decahydro - 6 - cyclopropylmethyl - 7,13b - methano - 13bH - indolo[3,2-e][2]benzazocine A mixture of 4.5 g. (0.0135 mole) of trans 1,2,3,4, 4a,5,6,7,8,13 - decahydro - 6 - cyclopropylcarbonyl - 7, 13b - methano - 13bH - indolo[3,2 - e][2]benzazocine, 1.5 g. (0.0375 mole) lithium aluminum hydride, and 250 ml. of tetrahydrofuran was refluxed for 5 hrs. and hydrolyzed in the usual manner. The tetrahydrofuran was distilled off, the residual oil was dissolved in 300 ml. of ether, and etheral hydrogen chloride was added. The resulting precipitate was triturated with ethanol and then recrystallized from the same solvent to give 3.8 g. of hydrochloride, M.P. 292–293° dec.

Analysis.—Calcd. for $C_{22}H_{28}N_2 \cdot HCl \cdot 0.25C_2H_5OH$ (percent): C, 73.34; H, 8.34; Cl, 9.62; N, 7.60; O, 1.09. Found (percent): C, 73.52; N, 8.10; Cl, 9.65; N, 7.59; O, 1.23.

A mixture of 1.0 g. of the hydrochloride and 300 ml. of water was warmed to 50°. The resulting solution was cooled to room temperature, made basic with 1 N sodium hydroxide, and extracted with ether. Evaporation of the dried ether solution gave 0.9 g. of amorphous solid, M.P. 60–65°. Sublimation of 0.5 g. at 175° and 0.025 mm. gave 0.35 g. of the base, M.P. 60–65°.

Analysis.—Calcd. for $C_{22}H_{28}N_2$ (percent): C, 82.45; H, 8.81; N, 8.74. Found (percent): C, 82.23; H, 8.59; N, 8.55.

EXAMPLE 12

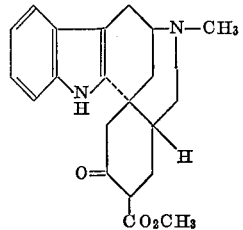

Trans methyl 1,2,3,4,4a,5,6,7,8,13 - decahydro - 6-methyl - 2 - oxo - 7,13b - methano - 13bH - indolo[3, 2-e][2]benzazocine-3-carboxylate A mixture of 1.0 g. (0.0034 mole) of trans 1,2,3,4, 4a, 5,6,7,8,13 - decahydro - 6 - methyl - 7,13b - methano-13bH - indolo[3,2-e][2]benzazocin - 2 - one, 0.034 mole of sodium hydride, 3.7 g. (0.041 mole) of dimethyl carbonate, and 50 ml. of tetrahydrofuran was refluxed for 24 hrs. It was concentrated to a small volume and poured into ice-water containing excess hydrochloric acid. The mixture was made alkaline with sodium bicarbonate and extracted with dichloromethane. Evaporation of the dried solution gave 1 g. of crystalline residue, M.P. 215–221° dec. Trituration with methanol gave 0.5 g. of material, M.P. 232–234° dec. Recrystallization from methanol-dichloromethane gave an analytical sample, M.P. 233–234° dec.

Analysis.—Calcd. for $C_{21}H_{24}N_2O_3$ (percent): C, 71.57; H, 6.86; N, 7.95. Found (percent): C, 71.31; H, 6.95; N, 7.89.

EXAMPLE 13

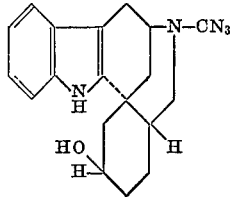

Trans 1,2,3,4,4a,5,6,7,8,13 - decahydro - 6 - methyl - 7, 13b-methano-13bH-indolo[3,2-e][2]benzazocin-2-ol A mixture of 1.0 g. (0.003 mole) of trans 1,2,3,4, 4a,5,6,7,8,13 - decahydro - 6 - methyl - 7,13b - methano-13bH - indolo[3,2 - e][2]benzazocin - 2 - one, 1.0 g. (0.026 mole) of lithium aluminum hydride, and 150 ml. of tetrahydrofuran was stirred at room temperature for 20 hrs., hydrolyzed, and filtered. Evaporation of the filtrate gave a solid residue which was triturated with ethyl acetate and then recrystallized from the same solvent to give 0.5 g. of crystalline product, M.P. 218–220° dec., infrared absorption at 3590, 3260 cm.$^{-1}$.

Analysis.—Calcd. for $C_{19}H_{24}N_2O$ (percent): C, 76.99; H, 8.16; N, 9.45. Found (percent): C, 76.71; H, 8.18; N, 9.19.

EXAMPLE 14

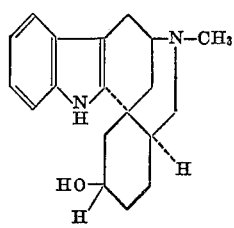

Cis 1,2,3,4,4a,5,6,7,8,13-decahydro-6-methyl-7,13bH methano-13bH-indolo[3,2-e][2]benzazocin-2-ol A mixture of 1.0 g. (0.003 mole) of cis 1,2,3,4,4a,5,6,7,8,13-decahydro-6-methyl-7,13b-methano - 13bH - indolo [3,2-e][2]benzazocin-2-one, 1.0 g. (0.026 mole) of lithium aluminum hydride, and 150 ml. of tetrahydrofuran was stirred at room temperature for 20 hrs., hydrolyzed, and filtered. Evaporation of the filtrate gave a solid residue which was triturated with acetonitrile to give 0.86 g. of crystalline product, M.P. 275–277° dec. (darkens at 260°). Recrystallization from acetonitrile-dichloromethane gave 0.45 g. of material, M.P. 275–277° dec. (darkens at 260°). Infrared absorption at 3610, 3460 cm.$^{-1}$.

*Analysis.*—Calcd. for $C_{19}H_{24}N_2O$ (percent): C, 76.99; H, 8.16; N, 9.45. Found (percent): C, 77.19; H, 8.14; N, 9.65.

EXAMPLE 15

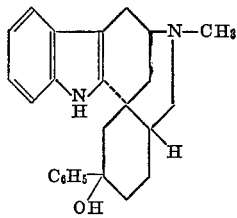

Trans 1,2,3,4,4a,5,6,7,8,13-decahydro-6-methyl-2-phenyl 7,13b-methano-13bH-indolo[3,2-e][2]benzazocin-2-ol To a mixture of 5 ml. of 3 M ethereal phenylmagnesium bromide and 125 ml. of tetrahydrofuran was added 0.59 g. (0.002 mole) of trans 1,2,3,4,4a,5,6,7,8,13-decahydro-6-methyl-7,13b - methano-13bH - indolo[3,2-e][2] benzazocin-2-one in 25 ml. of tetrahydrofuran. The mixture was stirred at +3° for 6 hrs., poured into excess aqueous ammonium chloride solution, and extracted with dichloromethane. The gummy extract was triturated with methanol to give 0.039 g. of product, M.P. 265–270° dec. (darkens at 245°). Recrystallization from methanol-dichloromethane gave 0.20 g. of an analytical sample, M.P. 270–273° dec. (darkens at 260°). Infrared absorption at 3555 and 3100 cm.$^{-1}$.

*Analysis.*—Calcd. for $C_{25}H_{28}N_2O$ (percent): C, 80.61; H, 7.58; N, 7.52. Found (percent): C, 80.41; H, 7.72; N, 7.70.

EXAMPLE 16

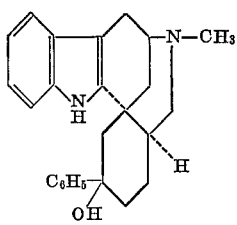

Cis 1,2,3,4,4a,5,6,7,8,13-decahydro-6-methyl-2-phenyl 7,13b-methano-13bH-indolo[3,2-e][2]benzazocin-2-ol To a mixture of 5 ml. of 3 M ethereal phenylmagnesium bromide and 125 ml. of tetrahydrofuran was added 0.59 g. (0.002 mole) of cis 1,2,3,4,4a,5,6,7,8,13-decahydro-6-methyl-7,13b-methano-13bH-indolo[3,2-e][2]benzazocin-2-one in 25 ml. of tetrahydrofuran. The mixture was refluxed for 6 hrs., poured into excess aqueous ammonium chloride solution, and extracted with dichloromethane. The gummy extract was triturated with methanol to give 0.39 g. of product, M.P. 235–240° dec. Recrystallization from methanol-dichloromethane gave 0.25 g. of an analytical sample, M.P. 241–242° dec. Infrared absorption at 3570 and 3460 cm.$^{-1}$.

We claim:
1. A member selected from the group consisting of a free base of the formula:

Ia 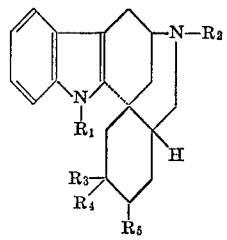

and

Ib 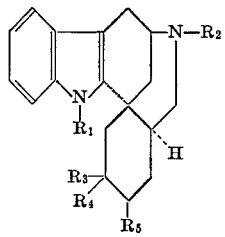

wherein $R_1$ is hydrogen, lower alkyl or phenyl lower alkyl; $R_2$ is hydrogen, lower alkyl, phenyl lower alkyl, allyl, cyclopropylmethyl, carbolower alkoxy, lower alkanoyl or benzoyl; $R_3$ and $R_4$ taken together are hydrogen and hydrogen respectively and hydrogen and ON respectively, lower alkyl and hydroxy respectively, phenyl and hydroxy respectively, phenyl lower alkyl and hydroxy respectively or keto; $R_5$ is hydrogen or carbo lower alkoxy, and its non-toxic pharmaceutically acceptable acid addition salts.

2. The compound of claim 1 which is 1,2,3,4,4a,5,6,7,8,13-decahydro-6-methyl - 7,13b - methano-13bH-indolo [3,2-e][2] benzazocin-2-one and its non-toxic pharmaceutically acceptable acid addition salts.

3. The compound of claim 1 which is 1,2,3,4,4a,5,6, 7, 8, 13 - decahydro-6,13-dimethyl-7,13b-methano-13bH-indolo[3,2-e][2]benzazocin-2-one and its non-toxic pharmaceutically acceptable acid addition salts.

4. The compound of claim 1 which is 1,2,3,4a,5,6,7, 8,13-decahydro - 6 - methyl-7,13b-methano-13bH-indolo [3,2-e][2]benzazocine and its non-toxic pharmaceutically acceptable acid addition salts.

5. The compound of claim 1 which is 1,2,3,4a,5,6,7, 8,13 - decahydro - 6,13 - dimethyl-7,13b-methano-13bH-indolo[3,2-e][2]benzazocine and its non-toxic pharmaceutically acceptable acid addition salts.

6. The compound of claim 1 which is 1,2,3,4,4a,5, 6,7,8,13-decahydro-6-carbethoxy - 7,13b - methano-13bH-indolo[3,2-e][2]benzazocine and its non-toxic pharmaceutically acceptable acid addition salts.

7. The compound of claim 1 which is 1,2,3,4,4a,5,6, 7,8,13 - decahydro-7,13b-methano-13bH-indolo[3,2-e][2] benzazocine and its non-toxic pharmaceutically acceptable acid addition salts.

8. The compound of claim 1 which is 1,2,3,4,4a,5,6, 7,8,13 - decahydro-6-cyclopropylcarbonyl-7,13b-methano-13bH-indolo[3,2-e][2]benzazocine and its non-toxic pharmaceutically acceptable acid addition salts.

9. The compound of claim 1 which is 1,2,3,4,4a,5,6, 7,8,13-decahydro - 6 - cyclopropylmethyl-7,13b-methano- 13bH-indolo[3,2-e][2]benzazocine and its non-toxic pharmaceutically acceptable acid addition salts.

10. The compound of claim 1 which is methyl 1,2,3,4,4a,5,6,7,8,13-decahydro-6-methyl-2-oxo-7,13b-methano-13bH-indolo[3,2-e][2]benzazocine-3-carboxylate and its non-toxic pharmaceutically acceptable acid addition salts.

11. The compound of claim 1 which is 1,2,3,4,4a,5,6,7,8,13-decahydro-6-methyl-7,13b-methano-13bH-indolo[3,2-e][2]benzazocin-2-ol and its non-toxic pharmaceutically acceptable acid addition salts.

References Cited

UNITED STATES PATENTS

| 2,870,162 | 1/1959 | Speeter et al. | 260—288 X |
| 3,326,923 | 6/1967 | Shavel et al. | 260—286 X |
| 3,331,849 | 7/1967 | Shavel et al. | 260—286 |

DONALD G. DAUS, Primary Examiner

U.S. Cl. X.R.

260—287, 288, 544; 424—250